(12) United States Patent
Matsumoto

(10) Patent No.: US 9,093,913 B2
(45) Date of Patent: Jul. 28, 2015

(54) SWITCHING POWER SUPPLY WITH DETECTION OF THE AC INPUT VOLTAGE

(75) Inventor: Shinichiro Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/425,326

(22) Filed: Mar. 20, 2012

(65) Prior Publication Data

US 2012/0250365 A1    Oct. 4, 2012

(30) Foreign Application Priority Data

Mar. 31, 2011   (JP) .................................. 2011-079482

(51) Int. Cl.
*H02M 1/36*   (2007.01)
*H02M 3/335*  (2006.01)
*H02M 7/217*  (2006.01)

(52) U.S. Cl.
CPC ............ *H02M 1/36* (2013.01); *H02M 3/33523* (2013.01); *H02M 7/217* (2013.01)

(58) Field of Classification Search
USPC ......... 363/52–54; 307/129; 361/92; 324/520; 340/663; 323/902
See application file for complete search history.

(56) References Cited

U.S. PATENT DOCUMENTS

| 6,847,131 B2 * | 1/2005 | Nakamura ...................... 307/85 |
| 8,305,047 B2 | 11/2012 | Lin et al. |
| 2002/0089233 A1 | 7/2002 | Nakamura |
| 2010/0073351 A1 * | 3/2010 | Lin et al. ........................ 345/212 |
| 2011/0068751 A1 * | 3/2011 | Lin et al. ....................... 320/166 |

FOREIGN PATENT DOCUMENTS

| CN | 201440615 U | | 4/2010 |
| JP | 02007826 A | * | 1/1990 |
| JP | 10-66334 A | | 3/1998 |
| JP | 2001-166645 A | | 6/2001 |
| JP | 2002-142447 A | | 5/2002 |
| JP | 2003-134816 A | | 5/2003 |
| JP | 2003-235265 A | | 8/2003 |
| JP | 2009-165305 A | | 7/2009 |

\* cited by examiner

*Primary Examiner* — Harry Behm
(74) *Attorney, Agent, or Firm* — Canon USA, Inc., IP Division

(57) ABSTRACT

A switching power supply includes a rectifying unit configured to rectify an input alternating voltage, a storage unit configured to smooth the voltage rectified by the rectifying unit and store as a DC voltage, a pulse signal generation unit configured to generate a pulse signal from the DC voltage stored in the storage unit, and a detection unit configured to detect that a commercial alternating current power supply has been turned off based on the pulse signal generated by the pulse signal generation unit.

14 Claims, 13 Drawing Sheets

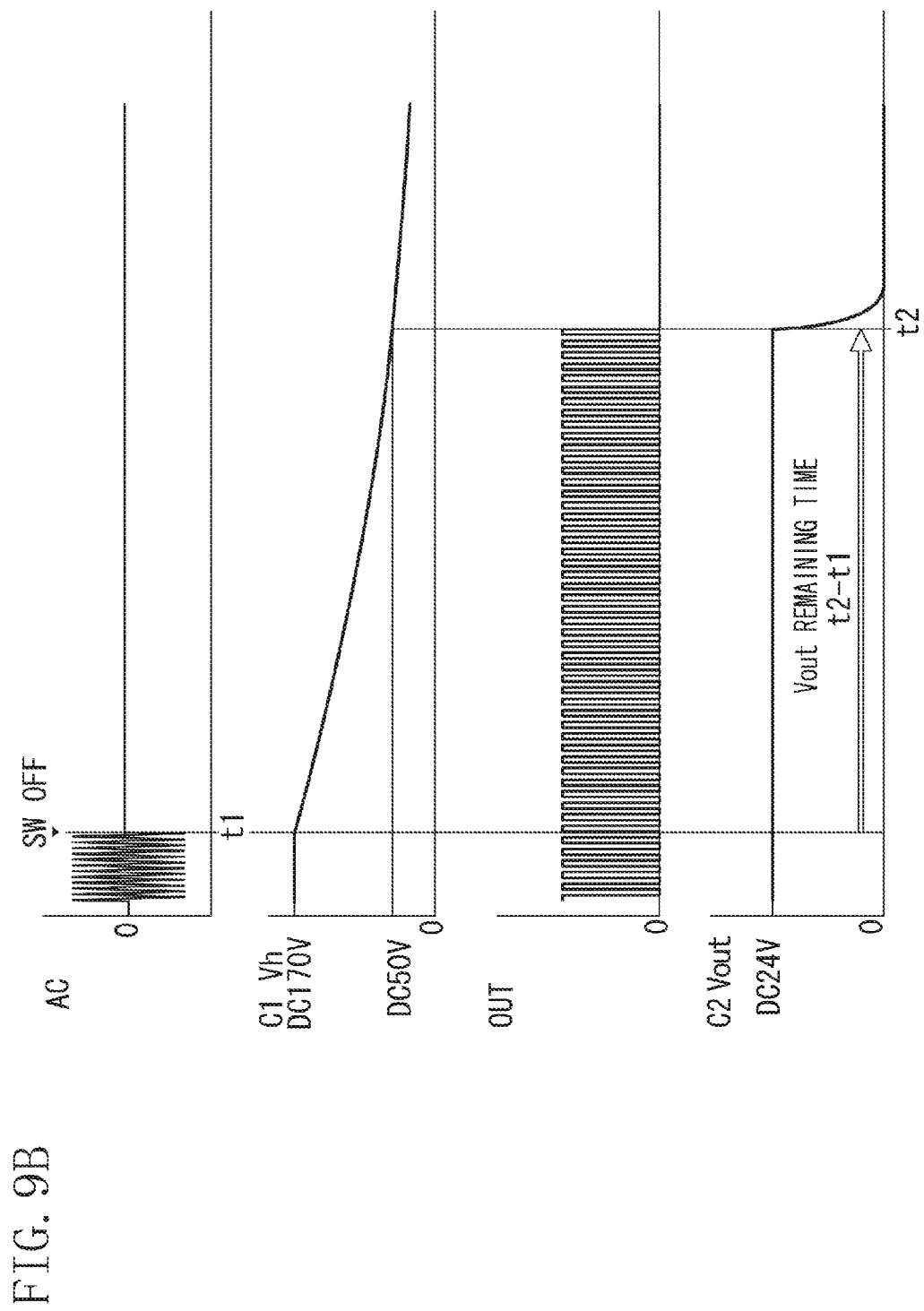

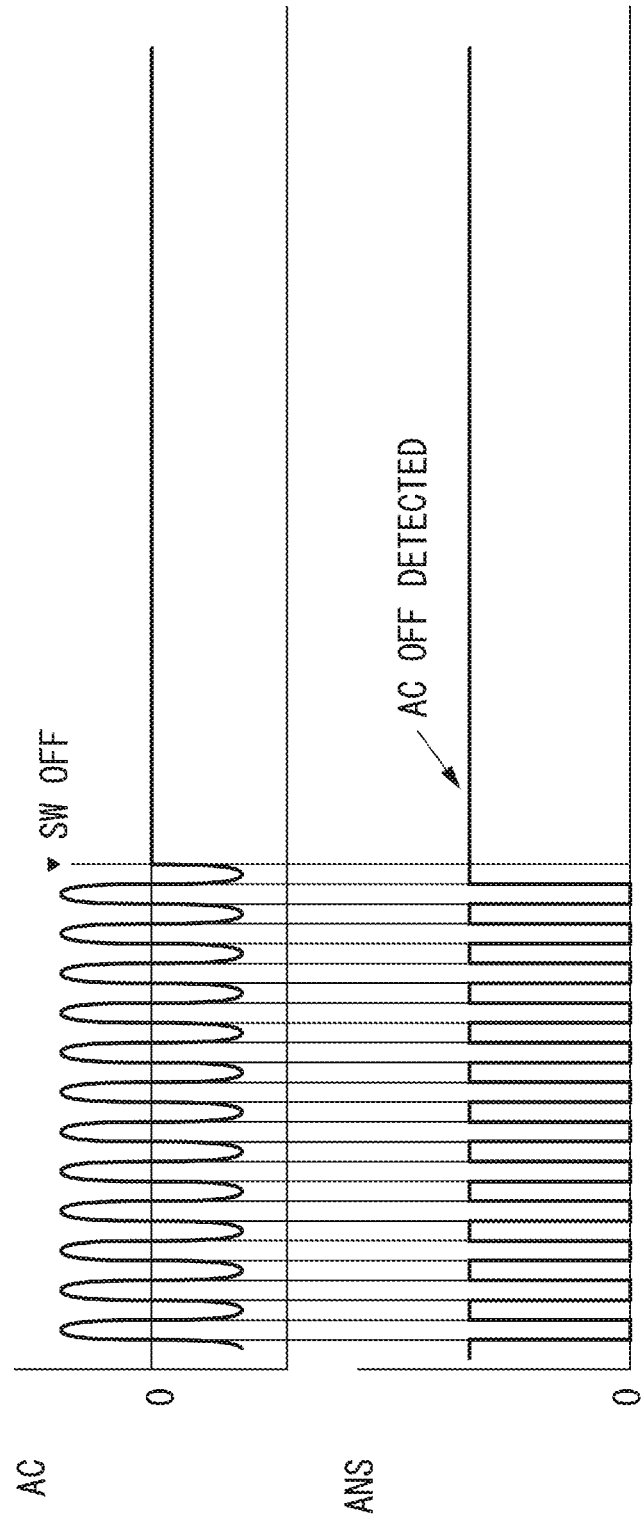

SWITCHING POWER SUPPLY WITH DETECTION OF THE AC INPUT VOLTAGE

BACKGROUND OF THE INVENTION

1. Field of the Invention

The present invention relates to a switching power supply for supplying power to a device.

2. Description of the Related Art

FIG. 9A illustrates a configuration of a conventional switching power supply. In FIG. 9A, an alternating current (AC) input from a commercial alternating current power supply is rectified by a diode bridge configured from D1, D2, D3, and D4 via switches SW1 and SW2, and is smoothed by a primary electrolytic capacitor C1. If the AC voltage is AC 120 Vrms, a C1 terminal voltage Vh is about DC 170 V. Vh is supplied to a field-effect transistor (FET) 1, which is a switching element, via a primary winding of a trans T1. On the other hand, Vh is also supplied to a pulse-width modulation (PWM) controller CONT 1. If Vh is equal to or more than a prescribed value (in this example, DC 50 V), CONT 1 supplies a pulse signal OUT to a gate terminal of the FET 1. Based on this pulse signal OUT, the FET 1 starts switching. When the FET 1 starts switching, a pulse voltage is induced in a secondary winding coil of the trans T1. This pulse voltage is rectified by a secondary rectification diode D5, and is smoothed by a secondary smoothing capacitor C2. Thus, a C2 terminal voltage Vout is a roughly constant voltage (in this example, DC 24 V).

Next, the operation of this switching power supply will be described. The output voltage Vout of the switching power supply is supplied to the respective modules mounted in the device. The respective modules in the device are, for example, a control unit CONT 2 configured from a central processing unit (CPU) and an application-specific integrated circuit (ASIC) for controlling operation of the device, and an actuator M that is an active device such as a motor or a solenoid. A control signal MTR is supplied from the control unit CONT 2 to the actuator M. The control unit CONT 2 drives the actuator M by setting the MTR signal to a HIGH level (hereinafter referred to as H level). Conversely, the control unit CONT 2 stops the actuator M by setting the MTR signal to a LOW level (hereinafter referred to as L level). The configuration of such a switching power supply is discussed in Japanese Patent Application Laid-Open No. 10-66334.

In the above switching power supply, there are the below-described problems when the switches SW1 and SW2 have been turned OFF. Operation when the switches SW1 and SW2 have been turned OFF will be described using FIG. 9B. In FIG. 9B, at time t1, when the switches SW1 and SW2 are turned OFF, the power supply from the commercial alternating current power AC (alternating voltage) is cut. After time t1, the switching power supply operates based on the power (charge) that has accumulated in the primary electrolytic capacitor C1. The terminal voltage Vh of the capacitor C1 gradually decreases from DC 170 V. At time t2, at which this Vh has dropped below the prescribed value (in this example, DC 50 V), a PWM controller CONT 1 stops output of an OUT signal. Consequently, the output voltage Vout of the switching power supply decreases, and the power supply (device) comes into a turned OFF state. Therefore, even though the switches SW1 and SW2 are OFF, during the period t2-t1, which is from the time t1 to the time t2, an output voltage Vout of the switching power supply is being produced. Further, the smaller the output power of the switching power supply is the longer the period t2-t1 becomes. Specifically, the smaller the amount of power consumed by the control unit CONT 2 and the actuator M, the longer the period t2-t1 becomes.

However, there is a need for a greater reduction in power consumption when a device is on standby. The amount of power that is consumed during standby is extremely small, as various measures are taken, such as stopping the actuator M and setting the control unit CONT 2 to a power-saving mode. Therefore, the above-described period t2-t1 becomes very long. For example, in some cases this period t2-t1 is several dozen seconds.

For example, if the device is a personal computer (PC) or some other information device, the user may want to increase the memory of the PC. In increasing memory, it is desirable that Vout has become zero to ensure the reliability of the memory and the information device itself. This is because if the user tries to add memory before Vout has reached zero, in a state in which charge still remains (conducting state) (also called hot-swapping), the memory can be damaged. Therefore, it is necessary to avoid such hot-swapping.

The memory could be added after the switches SW1 and SW2 have been turned OFF. However, Vout does not immediately decrease even if the switches SW1 and SW2 are turned OFF. During the period t2-t1 until Vout decreases, the user cannot add the memory, and the user has to wait until Vout reaches zero (until the charge stored in the primary electrolytic capacitor C1 reaches zero). Under these circumstances, usability is poor, since the user has to wait when adding memory.

This wait time is not limited to memory expansion. For example, such a wait time is a factor which deteriorates usability in various situations, such as during equipment maintenance performed by a repairman and when a device has to be restarted.

To resolve this problem, the device illustrated in FIG. 10 has been proposed. In FIG. 10, an alternating voltage from a commercial alternating current power AC is supplied to a diode D6, a resistor R7, and the light-emitting diode (LED) side of a photocoupler PC-A via a contact point of switches SW1 and SW2. On the PC-A phototransistor side, power is supplied as an ANS signal to the CONT 2. The operation waveform of this circuit is illustrated in FIG. 11. In FIG. 11, if the alternating voltage from the commercial alternating current power AC has a positive polarity, current flows to the LED side of the photocoupler PC-A, and the ANS signal is at an L level. Conversely, if the alternating voltage from the commercial alternating current power AC has a negative polarity, current does not flow to the LED side of the photocoupler PC-A, and the ANS signal is at an H level. More specifically, this ANS signal is a pulse signal that is synchronized with the frequency of the alternating voltage from the commercial alternating current power AC. This circuit configured from the diode D6, the resistor R7, and the photocoupler PC-A is also called a frequency detection circuit.

If the switches SW1 and SW2 are turned OFF at time t1 by this frequency detection circuit, and the alternating voltage supply from the commercial alternating current power AC to the device is cut, the ANS signal is fixed at the H level. If the ANS signal is output at the H level for a prescribed time or more, the control unit CONT 2 determines that the supply of alternating voltage from the commercial alternating current power AC has been stopped. However, in this method for detecting stopping of the alternating voltage supply with the frequency detection circuit (also referred to as AC-OFF detection), during the positive polarity half-wave of the alternating voltage from the commercial alternating current power AC, the LED current of the photocoupler PC-At is constantly flowing. This means that the photocoupler PC-A is consuming power even during device standby. This leads to the problem that power consumption cannot be sufficiently decreased in a power-saving operation state, such as during device standby.

SUMMARY OF THE INVENTION

The present invention is directed to detecting the stopping of an alternating voltage from a commercial alternating current power supply, and further decreasing the power consumption of the power supply during standby.

According to an aspect of the present invention, a switching power supply includes a transformer configured to transform and output a voltage obtained by switching a DC voltage obtained by rectifying and smoothing an input alternating voltage, an output unit configured to output a DC voltage obtained by rectifying and smoothing the voltage output by the transformer, a rectifying unit configured to rectify the alternating voltage, a storage unit configured to smooth the voltage rectified by the rectifying unit and store as a DC voltage, a pulse signal generation unit configured to generate a pulse signal from the DC voltage stored in the storage unit, and a detection unit configured to detect that an input of the alternating voltage has been turned off based on the pulse signal generated by the pulse signal generation unit.

According to another aspect of the present invention, an image forming apparatus includes an image forming unit, a drive unit configured to drive the image forming unit, a transformer configured to transform and output a voltage obtained by switching a DC voltage obtained by rectifying and smoothing an input alternating voltage, and a switching power supply configured to output to the drive unit the DC voltage obtained by rectifying and smoothing the voltage output by the transformer, wherein the switching power supply includes a rectifying unit configured to rectify an alternating voltage from a commercial alternating current power supply, a storage unit configured to smooth the voltage rectified by the rectifying unit and store as a DC voltage, a pulse signal generation unit configured to generate a pulse signal from the DC voltage stored in the storage unit, and a control unit configured to determine whether an alternating voltage from the commercial alternating current power supply has been turned off by detecting the pulse signal generated by the pulse signal generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A and 9B illustrate a conventional switching power supply.

FIG. 11 illustrates an operation waveform of a conventional switching power supply.

DESCRIPTION OF THE EMBODIMENTS

Various exemplary embodiments, features, and aspects of the invention will be described in detail below with reference to the drawings.

The configuration and operation of the present invention will now be described. However, the following exemplary embodiments are merely an example, and in no way limit the technical scope of the present invention.

A first exemplary embodiment will now be described.

Figure 1:
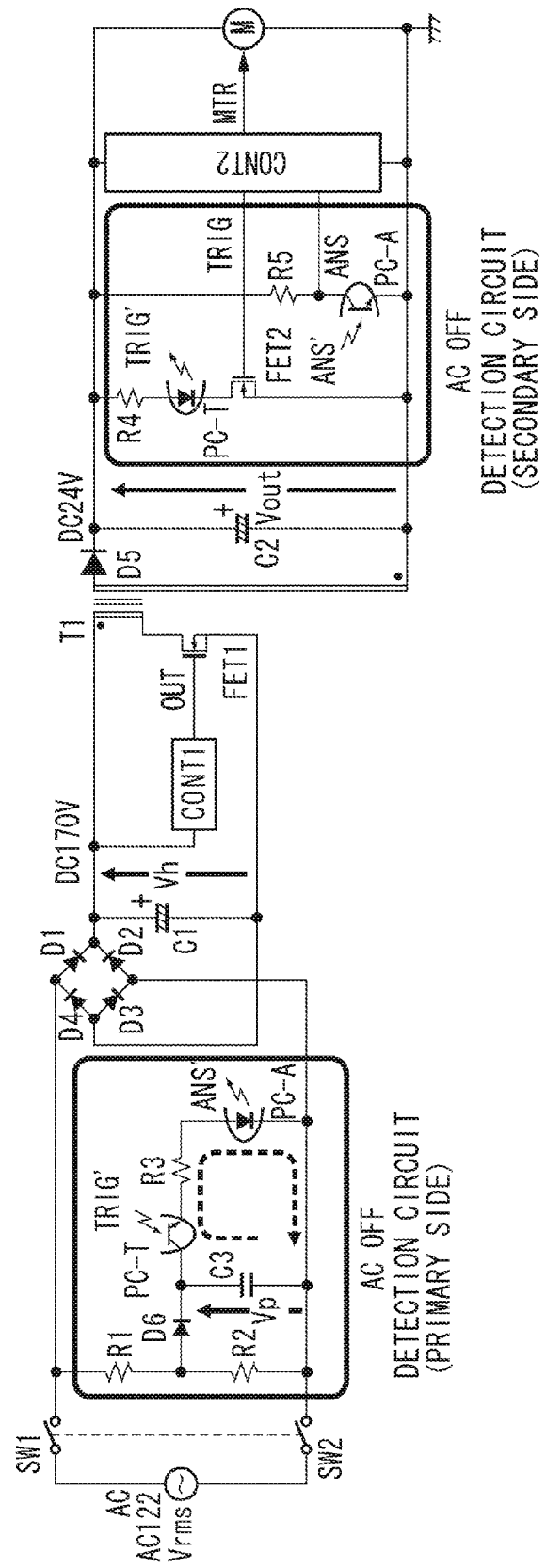
FIG. 1 illustrates a switching power supply circuit according to a first exemplary embodiment.

FIG. 1 illustrates a configuration of a switching power supply according to the first exemplary embodiment. A feature of the present exemplary embodiment is that a circuit with a reduced power consumption is provided as a detection circuit (hereinafter also referred to as AC-OFF detection circuit) that detects that a switching power supply switch in a device has been turned OFF. When a switch is detected as being OFF by the AC-OFF detection circuit according to the present exemplary embodiment, the output power of the switching power supply is increased by driving an actuator in the device. Consequently, the period from when the switch is turned OFF until the output voltage of the switching power supply is reduced and the device is turned off can be shortened. Operation of the switching power supply according to the present exemplary embodiment will now be described in more detail.

In FIG. 1, an alternating current from a commercial alternating current power AC is rectified by a diode bridge (D1, D2, D3, and D4) via switches SW1 and SW2, and is smoothed by a primary electrolytic capacitor C1. If the value of the alternating voltage in the present exemplary embodiment is AC 120 Vrms, a terminal voltage Vh of the primary electrolytic capacitor C1 as an element for storing DC voltage is about DC 170 V. The terminal voltage Vh is supplied to a FET 1, which is a switching element, via a primary winding of a trans T1 that transforms the voltage input from the commercial alternating current power AC. On the other hand, the terminal voltage Vh is also supplied to the PWM controller CONT 1 (hereinafter referred to as CONT 1). If the terminal voltage Vh is equal to or more than a prescribed value (in the present exemplary embodiment, DC 50 V), this controller CONT 1 supplies a pulse signal OUT to a gate terminal of the FET 1. Based on this signal, the FET 1 starts a switching operation. When the FET 1 performs switching, a pulse voltage is induced in a secondary winding coil of the trans T1. This pulse voltage is rectified by a secondary rectification diode D5, and is smoothed by a secondary smoothing capacitor C2. Thus, a terminal voltage Vout of the secondary smoothing capacitor C2 is a roughly constant voltage (in the present exemplary embodiment, DC 24 V).

Next, the operation of a device mounted with the switching power supply according to the present exemplary embodiment will be described. The output voltage Vout of the switching power supply serves as the power supply for the respective modules in the device. The respective modules in the device are, for example, a control unit CONT 2 configured from a CPU and an ASIC, and an actuator M that is an active device such as a motor or a solenoid. The voltage from the switching power supply is supplied to these modules. A control signal MTR is supplied from the control unit CONT 2 to the actuator M. The control unit CONT 2 drives the actuator M by setting the control signal MTR to a HIGH level. Conversely, the control unit CONT 2 stops the actuator M by setting the control signal MTR to a LOW level.

Next, the configuration of the AC-OFF detection circuit, which is a feature of the present exemplary embodiment, will be described in more detail. First, the configuration of the AC-OFF detection circuit on the primary side of the switching power supply will be described. An alternating current from the commercial alternating current power AC is divided by resistors R1 and R2. Therefore, an alternating voltage is supplied to the anode of a diode D6. This alternating voltage is rectified and smoothed by the diode D6 and a capacitor C3, and is converted into a DC voltage Vp. The DC voltage Vp is supplied to a resistor R3 and a second photocoupler PC-A (LED side) via a first photocoupler PC-T (phototransistor side). On the other hand, the LED side of the first photocoupler PC-T and the phototransistor side of the second photocoupler PC-A are connected to the secondary side of the switching power supply. In addition, in substitution for the photocoupler, magnetic isolator or generic isolating coupler is used.

On the secondary side of the switching power supply, the voltage detected at the primary side by the control unit CONT 2 to which the DC voltage produced at the secondary side is supplied, is supplied, and an AC-OFF detection circuit that operates based on a signal from the control unit CONT 2 is provided. The AC-OFF detection circuit on the secondary side is connected to a resistor R4, the LED of the first photocoupler PC-T, which is directly connected to the resistor R4, a FET 2 that is driven based on a TRIG signal (signal line) from the control unit CONT 2, a resistor R5, the phototransistor of the second photocoupler PC-A, which is directly connected to the resistor R5, and an ANS signal (signal line) as a pulse voltage to the control unit CONT 2.

The control unit CONT 2 turns the FET 2 ON, lights up the LED of the first photocoupler PC-T, and turns ON the phototransistor of the first photocoupler PC-T by setting the TRIG signal to a HIGH level (hereinafter referred to as H level). Conversely, by setting the TRIG signal to a LOW level (hereinafter L level), the control unit CONT 2 turns OFF the phototransistor of the first photocoupler PC-T. Further, the ANS signal is supplied to the control unit CONT 2. When the LED of the second photocoupler PC-A is lit, the ANS signal is at an L level. Conversely, when the LED of the second photocoupler PC-A is not lit, the ANS signal is at an H level. The control unit CONT 2 sets the TRIG signal to a prescribed frequency and a prescribed duty at the H level, and periodically turns ON the phototransistor of the first photocoupler PC-T. As described below, during the periods t11 to t13, t14 to t16, t17 to t19, t20 to t22, t23 to t25, and t26 to t27 in FIG. 2, the first photocoupler PC-T is ON.

Figure 2:
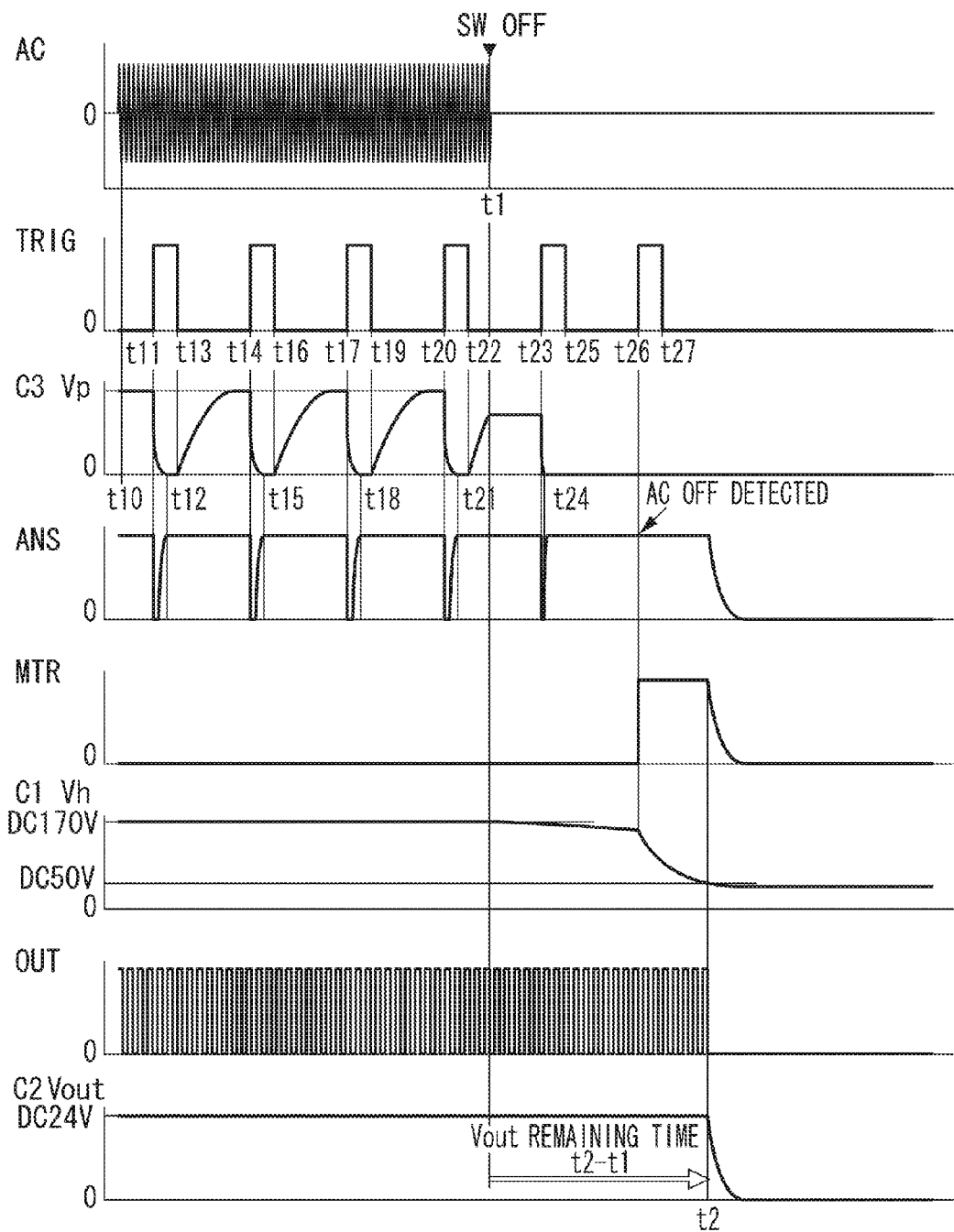
FIG. 2 illustrates an operation waveform of a switching power supply according to the first exemplary embodiment.

Next, operation of the AC-OFF detection circuit will be described in more detail using FIG. 2. In FIG. 2, at time t10, switches SW1 and SW2 are ON, and an AC voltage is supplied to the device from a commercial alternating current power supply AC. Therefore, the capacitor C3 is charged to the DC voltage Vp.

At time t11, when the control unit CONT 2 turns ON the phototransistor of the first photocoupler PC-T, current flows along the path "C3"→"phototransistor side of first photocoupler PC-T"→"R3"→"LED side of PC-A"→"C3" (path indicated by the dashed line in FIG. 2), so that the terminal voltage charged in the capacitor C3 is discharged.

At this stage, the LED of the second photocoupler PC-A is lit, and the ANS signal is at the L level. The control unit CONT 2 detects that the ANS is at the L level, and determines that the switches SW1 and SW2 are ON. The terminal voltage of the capacitor C3 is discharged while the phototransistor of the first photocoupler PC-T is ON, and drops to zero (time t12 in FIG. 2).

At time t13, when the control unit CONT 2 turns OFF the phototransistor of the first photocoupler PC-T, the commercial alternating current power AC is supplied to the capacitor C3 via the resistor R1 and the diode D6. Accordingly the capacitor C3 is charged again to the DC voltage Vp.

Subsequently, the switches SW1 and SW2 are turned ON, and the same operations are repeated during the period that power is supplied to the device from the commercial alternating current power supply AC (periods t14 to t16, t17 to t19, and t20 to t22). Specifically, when the TRIG signal is set to the H level, the control unit CONT 2 can detect that the ANS signal will immediately be at the L level, and determine that power is being supplied to the device from the commercial alternating current power supply AC.

Further, when the switches SW1 and SW2 are turned OFF, and the supply of the alternating voltage from the commercial alternating current power AC is stopped, charging of the capacitor C3 is stopped. Therefore, the capacitor C3 terminal voltage does not reach the value Vp that is reached when supplying power as described above, and is held at a low voltage (t1 to t23 period).

At time t23, when the control unit CONT 2 turns ON the phototransistor of the first photocoupler PC-T, current flows along the path "C3"→"R3"→"LED side of second photocoupler PC-A"→"C3" (path indicated by the dashed line in FIG. 2), so that the terminal voltage charged in the capacitor C3 is discharged, and drops to zero. At this stage, the LED of the second photocoupler PC-A is lit, and the ANS signal is at the L level.

In addition, at time t25, although the control unit CONT 2 turns OFF the phototransistor of the first photocoupler PC-T, since switches SW1 and SW2 are OFF, the capacitor C3 terminal voltage remains at zero. Therefore, at time t26, even if the control unit CONT 2 turns ON the phototransistor of the first photocoupler PC-T, the LED of the second photocoupler PC-A does not light up, and the ANS signal remains at the H level. At this stage, the control unit CONT 2 can determine that the switches SW1 and SW2 have been turned OFF by detecting that the ANS signal remains at the H level even though the TRIG signal has been set to the H level.

Specifically, in the circuit illustrated in FIG. 1, it can be determined whether switches SW1 and SW2 are ON or OFF based on a signal transmission operation in a pulse signal generation unit performed by the first photocoupler and the second photocoupler. More specifically, it can be determined whether switches SW1 and SW2 are ON or OFF because if switches SW1 and SW2 are in an ON state, a pulse voltage is detected as the ANS signal, while if switches SW1 and SW2 are OFF, a pulse voltage cannot be detected as the ANS signal.

If the control unit CONT 2 detects that switches SW1 and SW2 have been turned OFF, the control unit CONT 2 drives the actuator M by setting the MTR signal, which is a signal that instructs drive of the actuator M, to a H level. Then, since the output power of the switching power supply increases, the terminal voltage Vh of the primary electrolytic capacitor C1 rapidly decreases from DC 170 V. At time t2, at which the terminal voltage Vh has dropped below the prescribed value (in the present exemplary embodiment, DC 50 V), the controller CONT 1 stops the OUT signal. Consequently, the output voltage Vout of the switching power supply decreases, and the device is in an OFF state.

Thus, the above-described period (time) t2 to t1 can be shortened, and by immediately detecting turn-OFF of the switch, the switching power supply can be turned OFF in a short period of time.

In addition, the determination regarding whether an alternating voltage is being supplied to the device from the commercial alternating current power supply AC is made based on a pulse voltage generated by the phototransistor of the first photocoupler PC-T. By setting this pulse voltage to a low duty and a low frequency, power consumption can be reduced more than a configuration that uses a conventional frequency detection circuit. Further, the duty and frequency of this pulse voltage may be appropriately set based on, for example, the level of power consumption to be reduced, the specifications of the switching power supply, and the specifications of the device.

A second exemplary embodiment will now be described.

Figure 3:
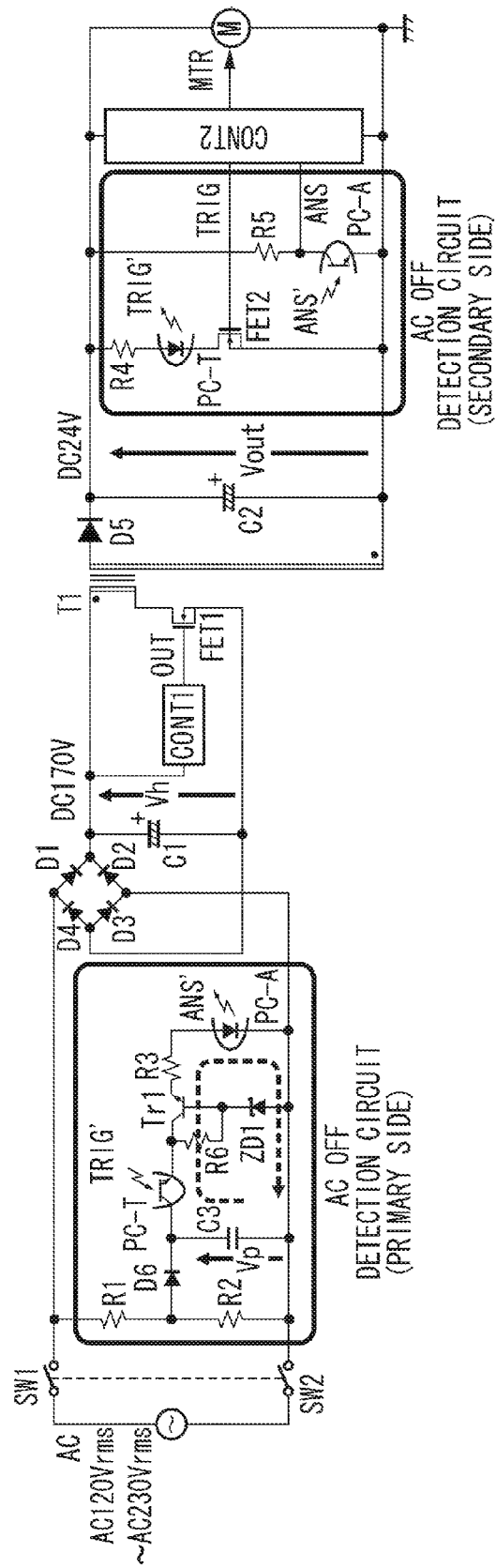
FIG. 3 illustrates a switching power supply circuit according to a second exemplary embodiment.

FIG. 3 illustrates a configuration of a switching power supply according to the second exemplary embodiment. A feature of the present exemplary embodiment is the addition of a constant voltage circuit configured from a resistor R6, a transistor Tr1, and a zener diode ZD1 on the primary side of the AC-OFF detection circuit according to the first exemplary embodiment. In the AC-OFF detection circuit described in the first exemplary embodiment, when the alternating voltage from the commercial alternating current power supply AC fluctuates, the charging voltage of the capacitor C3 fluctuates. Consequently, the current flowing to the LED of the photocoupler PC-A also fluctuates. As the commercial alternating current power AC, when a switching power supply is applied to a device usable in both an AC 115 V region and an AC 230 V region, the current flowing to the LED of the photocoupler PC-A needs to be properly limited if the alternating voltage from the commercial alternating current power supply AC fluctuates. Further, even in an AC 115 V region, the same measures need to be taken if the voltage fluctuation in the commercial alternating current power supply AC is large.

In the present exemplary embodiment, a constant voltage circuit is added as a circuit for limiting the current in order to handle such fluctuations in the commercial alternating current power supply AC. The configuration and operation of the AC-OFF detection circuit according to the present exemplary embodiment will now be described in more detail. However, since the operation of the switching power supply is the same as in the first exemplary embodiment, a description thereof will be omitted here.

In FIG. 3, an alternating current from the commercial alternating current power supply AC is divided by resistors R1 and R2. Therefore, an alternating voltage is supplied to the anode of a diode D6. This alternating voltage is rectified and smoothed by the diode D6 and a capacitor C3, and is converted into a DC voltage Vp. The DC voltage Vp is supplied to the constant voltage circuit configured from the resistor R6, the transistor Tr1, and the zener diode ZD1 via the phototransistor of the first photocoupler PC-T. The output voltage of the constant voltage circuit is supplied to the resistor R3 and the LED side of the second photocoupler PC-A. On the other hand, the LED side of the first photocoupler PC-T and the phototransistor side of the second photocoupler PC-A are connected to the secondary side of the switching power supply.

The control unit CONT 2 sets the TRIG signal to an H level to turn the FET 2 ON, lights up the LED of the first photocoupler PC-T, and turns ON the phototransistor of the first photocoupler PC-T. Conversely, by setting the TRIG signal to an L level, the control unit CONT 2 turns OFF the phototransistor of the first photocoupler PC-T. Further, the ANS signal is supplied to the control unit CONT 2. When the LED of the second photocoupler PC-A is lit, the ANS signal is at an L level. Conversely, when the LED of the second photocoupler PC-A is lit out, the ANS signal is at an H level.

The control unit CONT 2 sets the TRIG signal to a prescribed frequency and a prescribed duty at the H level, and periodically turns ON the phototransistor of the first photocoupler PC-T. (In FIG. 2, during each of the periods t11 to t13, t14 to t16, t17 to t19, t20 to t22, t23 to t25, and t26 to t27 in FIG. 2, which are described below, the first photocoupler PC-T is ON.)

Figure 4:
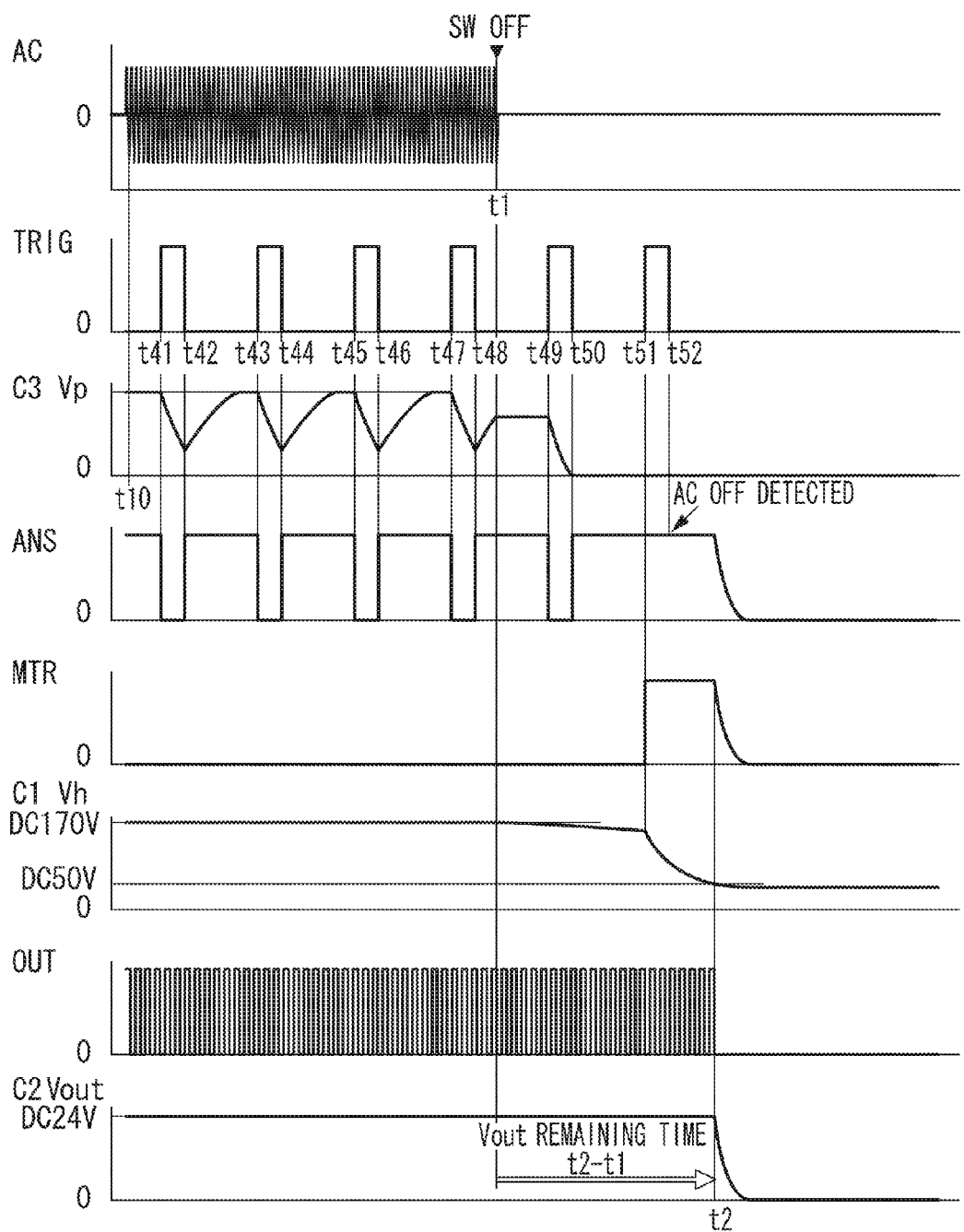
FIG. 4 illustrates an operation waveform of a switching power supply according to the second exemplary embodiment.

Next, operation of the AC-OFF detection circuit according to the present exemplary embodiment will be described using FIG. 4. First, at time t40, switches SW1 and SW2 are ON, and a commercial alternating current power AC is being supplied to the device. Therefore, the capacitor C3 is charged to the DC voltage Vp.

At time t41, when the control unit CONT 2 turns ON the phototransistor of the first photocoupler PC-T, current flows along the loop "C3"→"PC-T phototransistor side"→"Tr1"→"R3"→"LED side of PC-A"→"C3" (dashed line in FIG. 4), so that the terminal voltage of the capacitor C3 is discharged. At this stage, the LED of the second photocoupler PC-A is lit, and the ANS signal is at the L level. The current flowing to the LED of the second photocoupler PC-A is determined by the output voltage of the constant voltage circuit and the R3 constant, and is limited to a constant value.

The control unit CONT 2 detects that the ANS is at the L level, and determines that the switches SW1 and SW 2 have been turned ON. The terminal voltage of the capacitor C3 is discharged and decreased while the phototransistor of the first photocoupler PC-T is ON.

At time t42, when the control unit CONT 2 turns OFF the phototransistor of the first photocoupler PC-T, power from the commercial alternating current power supply AC is supplied to the capacitor C3 via the resistor R1 and the diode D6. Consequently, the capacitor C3 once again is charged to the DC voltage Vp.

Subsequently, with the switches SW1 and SW2 turned ON, the same operations are repeated during the period that alternating voltage is supplied to the device from the commercial alternating current power AC (periods t43 to t44, t45 to t46, and t47 to t48 in FIG. 4). In this operational state, when the TRIG signal is set to the H level, if the ANS signal immediately reaches the L level, the control unit CONT 2 can determine that power is being supplied to the device from the commercial alternating current power AC.

Further, when the switches SW1 and SW2 are turned OFF, and the supply of the alternating voltage from the commercial alternating current power AC is stopped, charging of the capacitor C3 is stopped. Therefore, the capacitor C3 terminal voltage does not reach Vp, and is held at a low voltage (t1 to t49 in FIG. 4). At time t49, when the control unit CONT 2 turns ON the phototransistor of the first photocoupler PC-T, current flows along the path "C3"→"PC-T phototransistor side"→"Tr1"→"R3"→"LED side of PC-A"→"C3" (dashed line in FIG. 4), so that the terminal voltage charged in the capacitor C3 is discharged, and drops to zero. At this stage, the LED of the second photocoupler PC-A is lit, and the ANS signal reaches the L level. In addition, at time t50, although the control unit CONT 2 turns OFF the phototransistor of the first photocoupler PC-T, since switches SW1 and SW2 are OFF, the capacitor C3 terminal voltage remains at zero. Therefore, at time t51, even if the control unit CONT 2 turns ON the phototransistor of the PC-T, the LED of the second photocoupler PC-A does not light up, and the ANS signal remains at the H level.

The control unit CONT 2 can determine that the switches SW1 and SW2 have been turned OFF by detecting that the ANS signal remains at the H level though the TRIG signal has been set to the H level. If the control unit CONT 2 detects that switches SW1 and SW2 have been turned OFF, the control unit CONT 2 drives the actuator M by setting the actuator M drive signal MTR to the H level. Then, the output power of the switching power supply increases, and the terminal voltage Vh of the primary electrolytic capacitor C1 rapidly decreases from DC 170 V. At time t2, at which the terminal voltage Vh has dropped below the prescribed value (in the present exemplary embodiment, DC 50 V), the controller CONT 1 stops the OUT signal. Consequently, the output power Vout of the switching power supply decreases, and the device is in an OFF state.

Thus, according to the present exemplary embodiment, the period (time) t2 to t1 can be shortened more than the above-described conventional circuit configuration. In addition, according to the present exemplary embodiment, the determination whether an alternating voltage is being supplied from the commercial alternating current power supply AC is made based on a pulse voltage generated by the phototransistor of the first photocoupler PC-T. According to this configuration, if the pulse voltage is set to a low duty and a low frequency, an even greater reduction in power consumption can be achieved.

Next, a third exemplary embodiment will be described using FIGS. 5 to 7. The present exemplary embodiment is an example in which a switching power supply is applied in a device having a frequency detection circuit that detects the frequency of an alternating voltage from a commercial alternating current power AC. Examples of a device having a frequency detection circuit and a switching power supply include an image forming apparatus that forms an image on a sheet of paper as a recording medium. Examples of image forming apparatuses include an electrophotographic laser beam printer.

Figure 5:
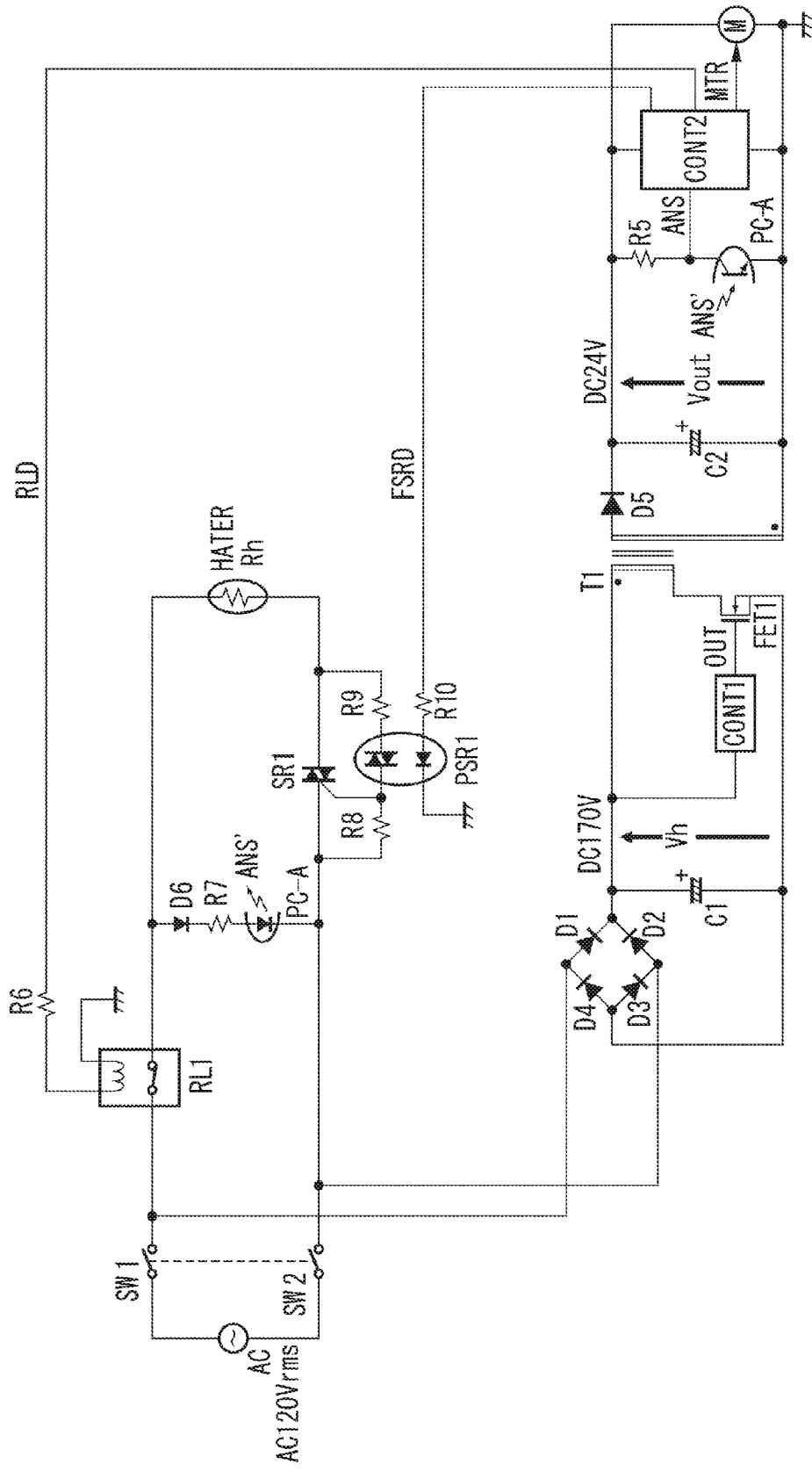
FIG. 5 illustrates a conventional frequency detection circuit, a heater drive circuit, and a switching power supply circuit.

FIG. 5 illustrates a heater drive circuit and a frequency detection circuit that are employed in a fixing apparatus in a laser beam printer. In FIG. 5, the drive circuit is configured from a relay RL1, a triac SR1, resistors R8, R9, and R10, and a phototriac PSR1. Further, the frequency detection circuit is configured from a diode D6, a resistor R7, and a photocoupler PC-A. In addition, there is a switching power supply circuit after the diode bridge (D1, D2, D3, and D4).

First, operation of the drive circuit of the heater Rh will be described. An alternating voltage from a commercial alternating current power supply AC is supplied to the heater Rh via a contact point side of the relay RL1. An RLD signal is supplied from the control unit CONT 2 to the coil side of the relay RL1 via the resistor 6. When the control unit CONT 2 sets the RLD signal to a HIGH level (hereinafter referred to as H level), the RL1 contact point conducts electricity. Conversely, when the control unit CONT 2 sets the RLD signal to a LOW level (hereinafter referred to as L level), the RL1 contact point is open. In an operating state of the device, pursuant to the control unit CONT 2, the RL1 contact point conducts electricity, while in a standby state of the device, the RL1 contact point is open.

The heater Rh is connected to the triac SR1. Resistors R8 and R9, and the phototriac PSR1 are connected to the triac SR1. A FSRD signal is supplied from the control unit CONT 2 to the phototriac PSR1 via the resistor R10.

If the control unit CONT 2 sets the FSRD signal to the H level, the triac SR1 is turned ON. If the control unit CONT 2 sets the FSRD signal to the L level, the triac SR1 is turned OFF. Therefore, when the relay RL1 is in a conducting state, if the control unit CONT 2 sets the FSRD signal to the H level, the triac SR1 is turned ON, and the heater Rh produces heat. Conversely, if the control unit CONT 2 sets the FSRD signal to the L level, the triac SR1 is turned OFF, and the heater Rh stops producing heat. The control unit CONT 2 performs control so that the temperature of the heated object is constant by appropriately turning the triac SR1 ON and OFF.

Next, operation of the frequency detection circuit will be described. An alternating voltage from the commercial alternating current power supply AC is supplied to the diode D6, the resistor R7, and the LED side of the photocoupler PC-A via a contact point of the relay RL1. From the phototransistor side of the photocoupler PC-A, an ANS signal is supplied to the control unit CONT 2.

Figure 6:
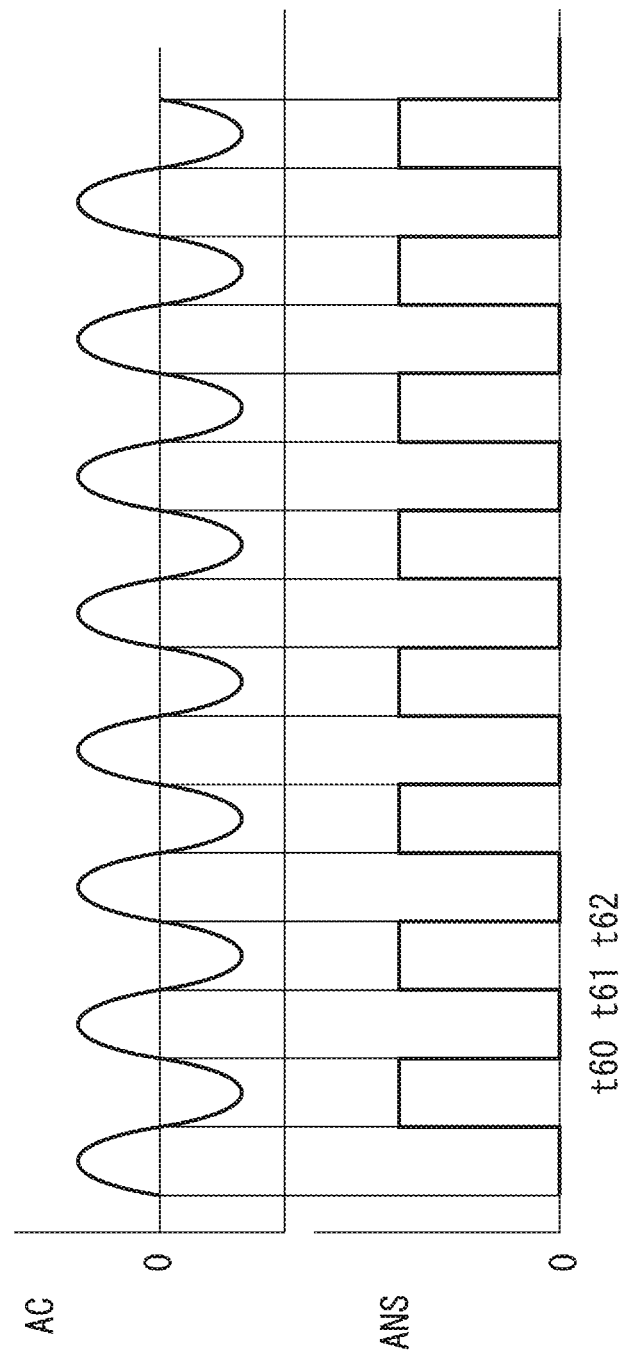
FIG. 6 illustrates an operation waveform of a conventional photocoupler.

As illustrated in FIG. 6, when the relay RL1 contact point is in a conducting state, if the commercial alternating current power supply AC has a positive polarity, current flows to the LED side of the photocoupler PC-A, and the ANS signal reaches the L level. Conversely, if the voltage from the commercial alternating current power supply AC has a negative polarity, current does not flow to the LED side of the photocoupler PC-A, and the ANS signal reaches the H level.

Therefore, this ANS signal indicates frequency information about the alternating voltage from the commercial alternating current power supply AC. The control unit CONT 2 controls the lighting timing of the heater Rh based on frequency information obtained from the ANS signal. Since the operation of the switching power supply is the same as in the first exemplary embodiment, a description thereof will be omitted here.

Figure 7:
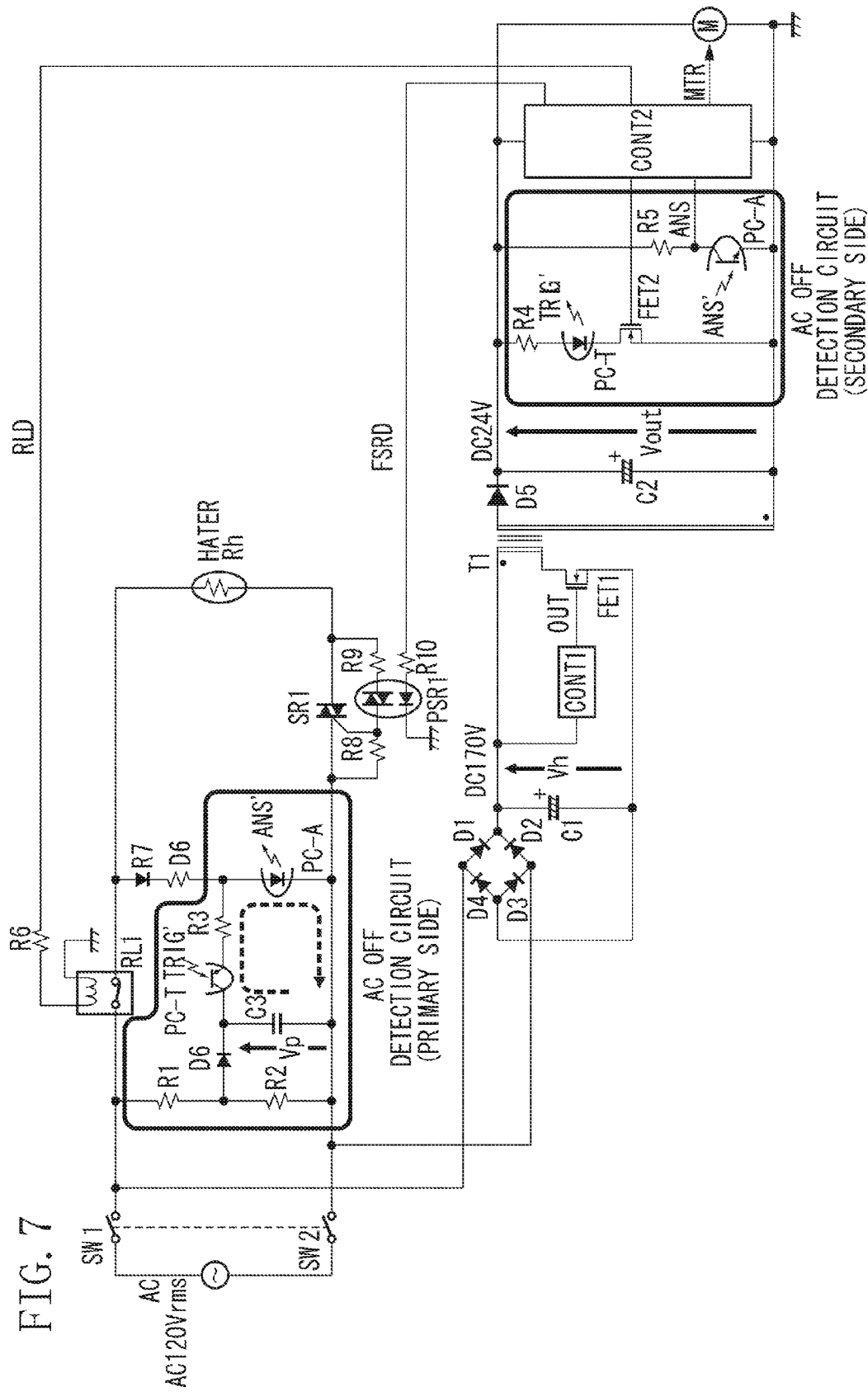
FIG. 7 illustrates a frequency detection circuit, a heater drive circuit, and a switching power supply circuit according to a third exemplary embodiment.

FIG. 7 illustrates a configuration when the AC-OFF detection circuit is employed in the heater drive circuit and the frequency detection circuit illustrated in FIG. 5. Since the operation of the AC-OFF detection circuit is the same as in the first exemplary embodiment, a description thereof will be omitted here.

A feature of the present exemplary embodiment is that the above-described frequency detection circuit photocoupler (PC-A) acts also as the AC-OFF detection circuit described in the first exemplary embodiment. Since a photocoupler is used also as the detection circuit, the circuit configuration is inexpensive.

In the present exemplary embodiment, since a photocoupler is used also as the detection circuit, when the relay RL1 contact point is conducting, i.e., when the device is in an operating state, the photocoupler PC-A operates as a frequency detection circuit photocoupler. Conversely, when the device is in a standby state, the photocoupler PC-A operates as an AC-OFF detection circuit photocoupler.

According to the present invention, a switching power supply can be employed in an image forming apparatus that has an inexpensive circuit configuration, which includes a heater drive circuit and a frequency detection circuit.

Figure 8:
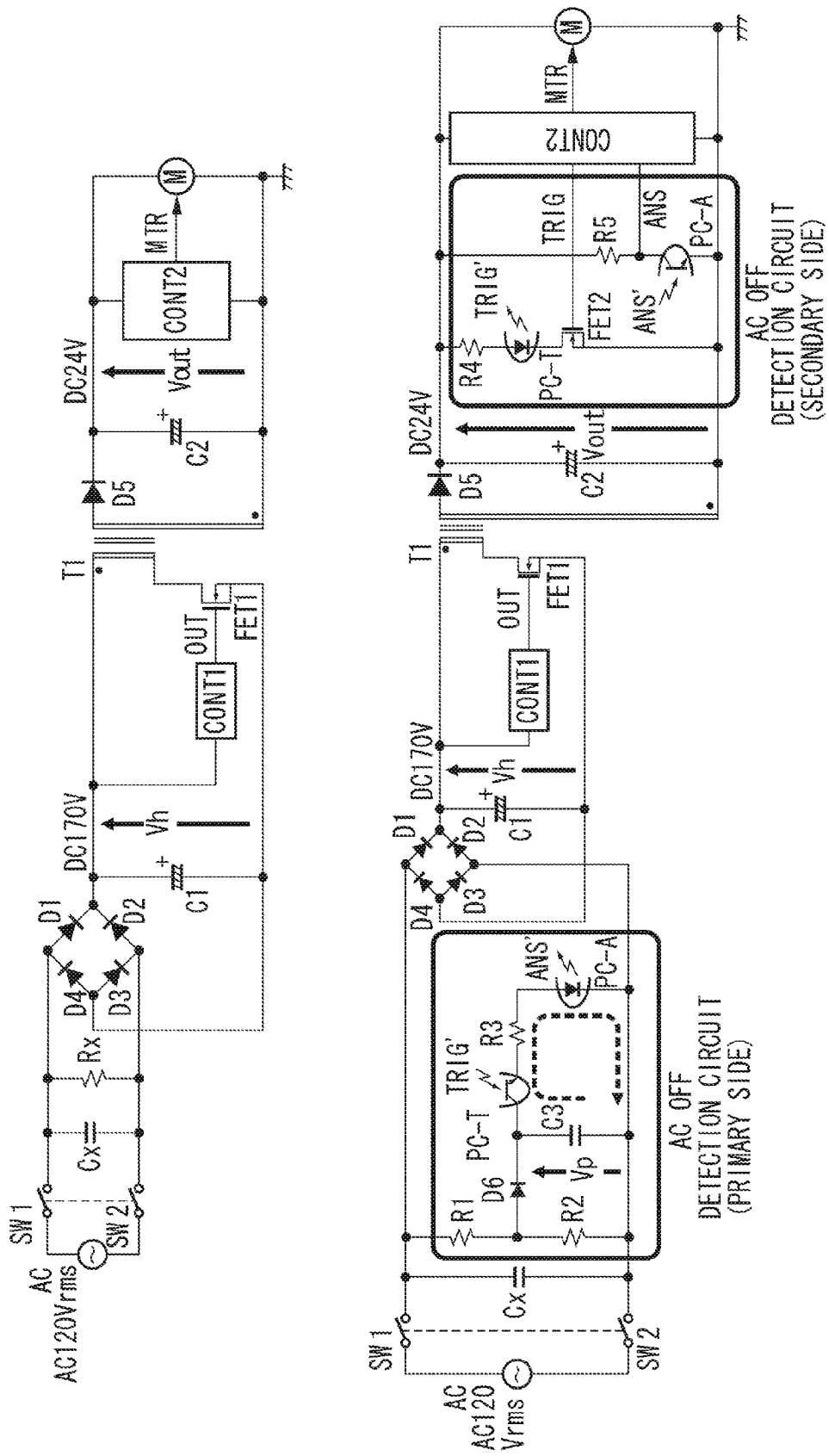
FIG. 8 illustrates a switching power supply circuit according to a fourth exemplary embodiment.
Figure 9A:
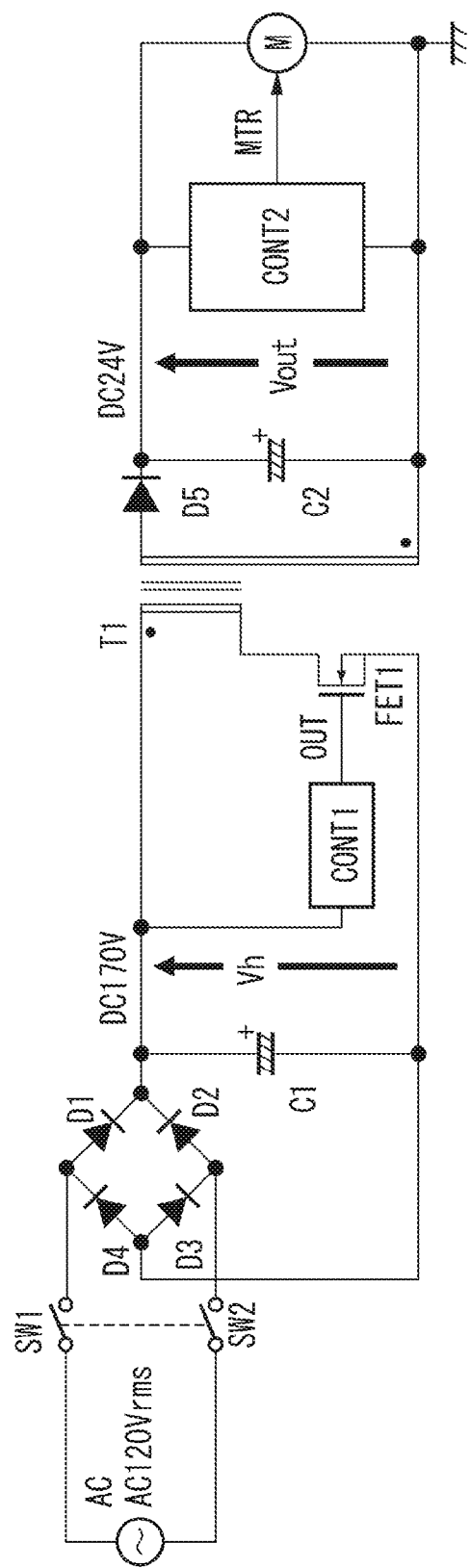
Figure 10:
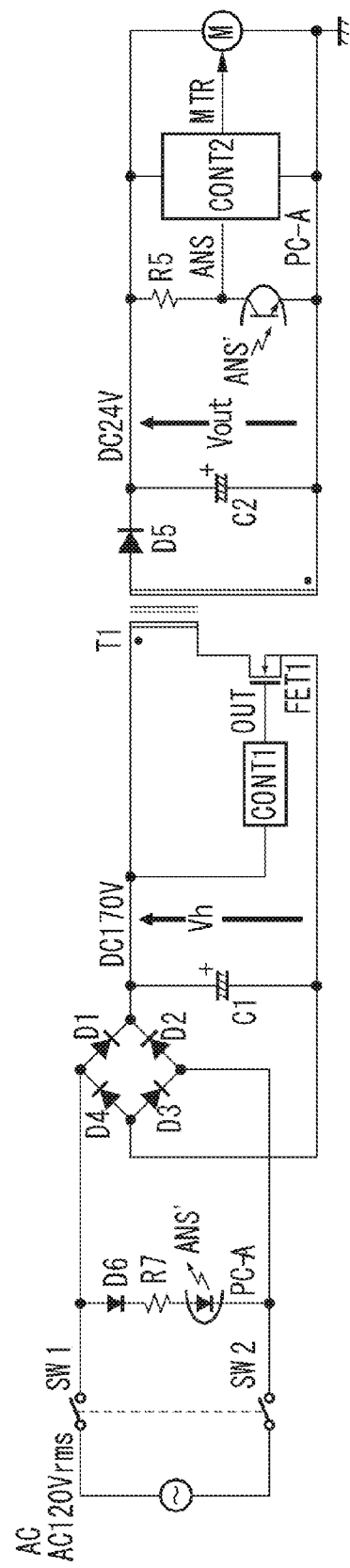
FIG. 10 illustrates a conventional switching power supply.

A fourth exemplary embodiment will now be described using FIG. 8. FIG. 8 illustrates a conventional switching power supply circuit. An overvoltage called a surge voltage can be momentarily superimposed on the alternating voltage supplied from an commercial alternating current power supply AC to the switching power supply. Such an overvoltage is caused by, for example, lightning striking an electric transmission line, and can cause damage to the circuit elements in the switching power supply. Therefore, it is common to carry out measures against such an occurrence by connecting a capacitor (also referred to as an X capacitor) Cx along the input line of the commercial alternating voltage of the switching power supply to absorb these overvoltages and protect the switching power supply in the device. Further, when this X capacitor Cx is provided, a discharge resistor Rx for discharging the X capacitor Cx is typically connected in parallel with the Cx.

FIG. 8 is a switching power supply circuit according to the fourth exemplary embodiment. A feature of the present exemplary embodiment is that the resistors R1 and R2 of the AC-OFF detection circuit also act as the above-described X capacitor Cx discharge resistor Rx. With such a configuration, the circuit configuration is inexpensive because it is not necessary to separately provide a discharge resistor Rx.

(Switched-Mode Power Supply Applied Example)

The switching power supplies described in the above first to fourth exemplary embodiments can be employed as a low voltage power supply in an image forming apparatus, such as a laser beam printer, a copying machine, and a facsimile. An applied example thereof is described below. The switching power supply can be employed as a power supply for supplying power to a motor, which is a drive unit of a conveyance roller that conveys a sheet in an image forming apparatus, as well as an actuator.

Figure 12A:
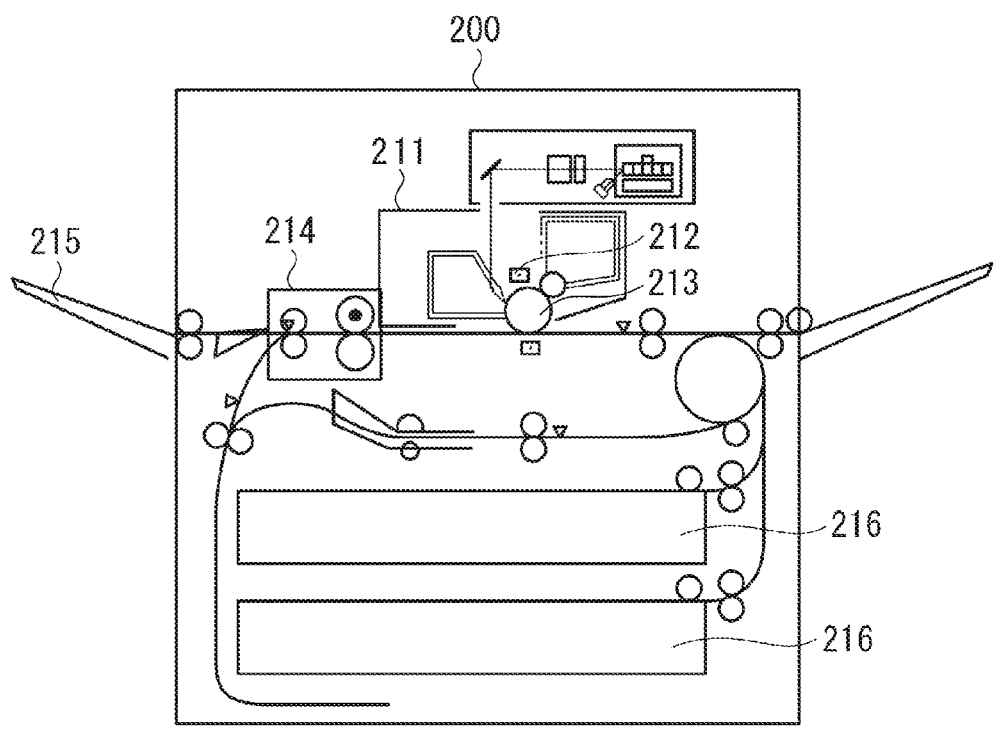
FIGS. 12A and 12B illustrate applicable examples of a switching power supply.
Figure 12B:
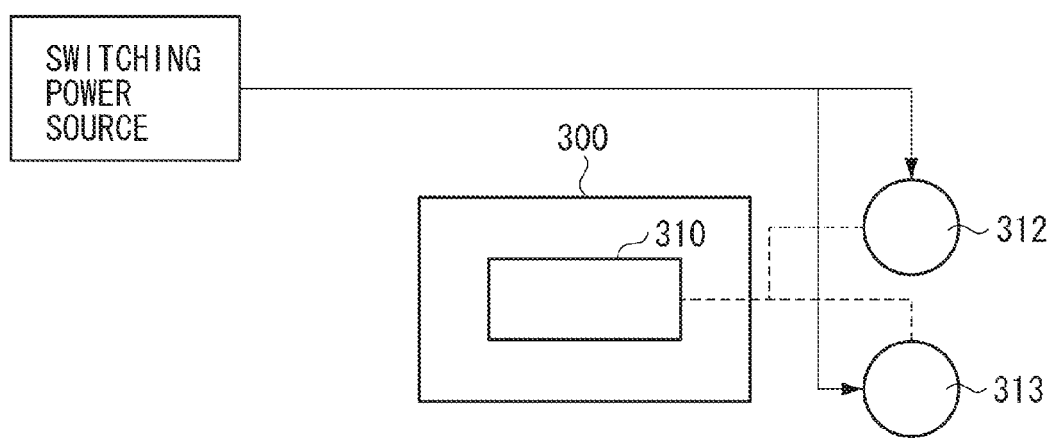

FIG. 12A illustrates a schematic configuration of a laser beam printer, which is an example of an image forming apparatus. A laser beam printer 200 includes, as an image forming unit 210, a photosensitive drum 211 that acts as an image carrier on which a latent image is formed and a developing unit 212 for developing the latent image formed on the photosensitive drum with toner. The toner image developed on the photosensitive drum 211 is transferred to a (not illustrated) sheet as a recording medium fed from a cassette 216. The toner image transferred onto the sheet is fixed by a fixing device 214, and discharged on a discharge tray 215. Further, FIG. 12B illustrates a power supply line from a power supply to a motor that acts as a drive unit in the image forming apparatus. The above-described switching power supply supplies power to a controller 300, which has a CPU 310 for controlling such an image forming operation. In addition, this switching power supply can also be used as a low voltage power supply for supplying power to a motors 312 and a motor 313 that act as drive units for image formation. As the power, 24 V is supplied to the motors. For example, the motor 312 is a motor that drives the conveyance roller for conveying the sheet, and the motor 313 is the motor that drives the fixing device 214. An image forming apparatus such as a laser beam printer can switch between an operating state in which image formation is executed, and a resting state in which image formation is not executed, to reduce power consumption by turning OFF the supply of power to the motors and the like. For example, when switched to the resting state, if the above switching power supply device is used, power consumption in the standby state can be reduced even further. The quasi-resonant power supply described in the first and second exemplary embodiments is not limited to the image forming apparatus illustrated here, and can also be used as a low voltage power supply for other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-079482 filed Mar. 31, 2011, which is hereby incorporated by reference herein in its entirety.

What is claimed is:

1. A switching power supply comprising:
   a transformer provided with a primary winding and a secondary winding;
   a secondary side-detection unit connected to the secondary winding of the transformer, configured to output a first pulse signal in a state that an alternating voltage is input to the transformer; and
   a primary side-detection unit connected to the primary winding of the transformer, configured to output a second pulse signal according to the first pulse signal;
   wherein the primary side-detection unit comprises:
      two resistive elements configured to divide an alternating voltage input to the primary winding of the transformer;
      a rectifying unit configured to rectify a voltage divided by the two resistive elements;
      a capacitor configured to store the voltage rectified by the rectifying unit; and
      a pulse signal output unit connected to the rectifying unit and the capacitor, configured to output the second pulse signal by receiving the first pulse signal and according to a voltage stored in the capacitor being thereby supplied,
   wherein, in a case where the alternating voltage is not input, a voltage of the capacitor of the primary side-detection unit is lowered, and the pulse signal output unit thereby stops outputting the second pulse signal.

2. The switching power supply according to claim 1, wherein the primary side-detection unit includes a first photodiode configured to output the second pulse signal.

3. The switching power supply according to claim 2, wherein the primary side-detection unit further includes a first phototransistor for receiving the first pulse signal.

4. The switching power supply according to claim 1, wherein the secondary side-detection unit includes a second photodiode for outputting the first pulse signal and a second phototransistor for receiving the second pulse signal.

5. The switching power supply according to claim 1, wherein the primary side-detection unit includes a frequency detection unit configured to detect a frequency of the alternating voltage, and a switch configured to switch on and off of the alternating voltage input to the frequency detection unit.

6. The switching power supply according to claim 1, wherein the primary-side detection unit outputs the second pulse signal in a predetermined frequency and in a case where the alternating voltage is input.

7. An image forming apparatus comprising:
   an image forming unit configured to form an image;
   a switching power supply configured to supply a voltage to the image forming apparatus;
   wherein the switching power supply comprises:
      a transformer provided with a primary winding and a secondary winding;
      a secondary side-detection unit connected to the secondary winding of the transformer, configured to output a first pulse signal in a state that an alternating voltage is input to the transformer; and a primary side-detection unit connected to the primary winding of the transformer, configured to output a second pulse signal according to the first pulse signal;

wherein the primary side-detection unit comprises:

two resistive elements configured to divide an alternating voltage input to the primary winding of the transformer;

a rectifying unit configured to rectify a voltage divided by the two resistive elements;

a capacitor configured to store the voltage rectified by the rectifying unit; and a pulse signal output unit connected to the rectifying unit and the capacitor, configured to output the second pulse signal by receiving the first pulse signal and according to a voltage stored in the capacitor being thereby supplied, wherein, in a case where the alternating voltage is not input, a voltage of the capacitor of the primary side-detection unit is lowered, and the pulse signal output unit thereby stops outputting the second pulse signal.

8. The image forming apparatus according to claim 7, further comprising: a drive unit configured to drive the image forming unit, wherein the switching power supply supplies a voltage to the drive unit.

9. The image forming apparatus according to claim 7, further comprising:

a control unit configured to control the image forming unit, wherein the switching power supply supplies a voltage to the control unit.

10. The image forming apparatus according to claim 7, wherein the primary side-detection unit includes a first photodiode configured to output the second pulse signal.

11. The image forming apparatus according to claim 10, wherein the primary side-detection unit further includes a first phototransistor for receiving the first pulse signal.

12. The image forming apparatus according to claim 7, wherein the secondary side-detection unit includes a photodiode for outputting the first pulse signal and a phototransistor for receiving the second pulse signal.

13. The image forming apparatus according to claim 7, wherein the primary side-detection unit includes a frequency detection unit configured to detect a frequency of the alternating voltage, and a switch configured to switch on and off of the alternating voltage input to the frequency detection unit.

14. The image forming apparatus according to claim 7, wherein the primary side-detection unit outputs the second pulse signal in a predetermined frequency and in a case where the alternating voltage is input.

* * * * *